Figure 1:
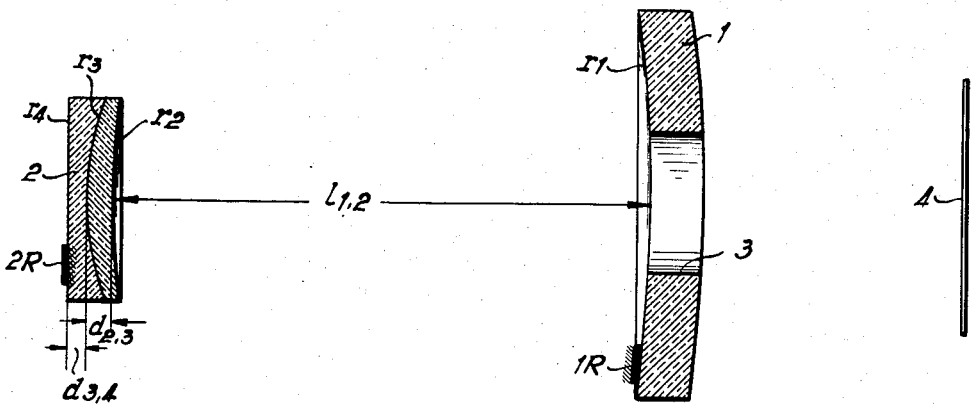

Jan. 17, 1961

K. STEGLICH 2,968,220

CASSEGRAIN MIRROR LENS OBJECTIVE

Filed March 28, 1958

INVENTOR
Kurt STEGLICH

ATTORNEY

United States Patent Office 2,968,220
Patented Jan. 17, 1961

2,968,220

CASSEGRAIN MIRROR LENS OBJECTIVE

Kurt Steglich, Berlin-Spandau, Germany, assignor to Askania-Werke A.G., Berlin-Friedenau, Germany, a corporation of Germany Filed Mar. 28, 1958, Ser. No. 724,640

Claims priority, application Germany Apr. 11, 1957

1 Claim. (Cl. 88—57)

This invention relates to Cassegrain mirror lens objectives for telescopes, for instance for theodolites, and particularly for those of wide range of distances covered. The invention is an improvement over that disclosed in the inventor's Patent 2,761,354.

Although the telescopes according to said patent provide excellent optics by means of strictly spherical elements, said optics being characterized by high achromatism as well as aplanatic correction and suppression of stray reflection, some residual chromatic aberration is unavoidable; and it is the object of the present improvement to minimize such aberration, substantially without sacrifice in other respects.

It is generally considered impossible so to minimize one error without sacrifice as to the correction of other errors. Nevertheless this has been found possible, particularly in telescopes for long distances, where otherwise the difficulties of optical design have reached a maximum, by a novel use of certain specific powers of dispersion of lens elements employed; such powers being known also as relative partial dispersions.

The exact definition and novel use of such powers will be understood most readily from the consideration of the following description of a preferred example. In the drawing, Figure 1 is a diagram of a sectional telescope according to this invention, the general arrangement of which is of the type known from said earlier patent and Figure 2 is a graphic representation of residual chromatic aberrations, provided by certain elements of said telescope in accordance with the present improvement.

Figure 2:
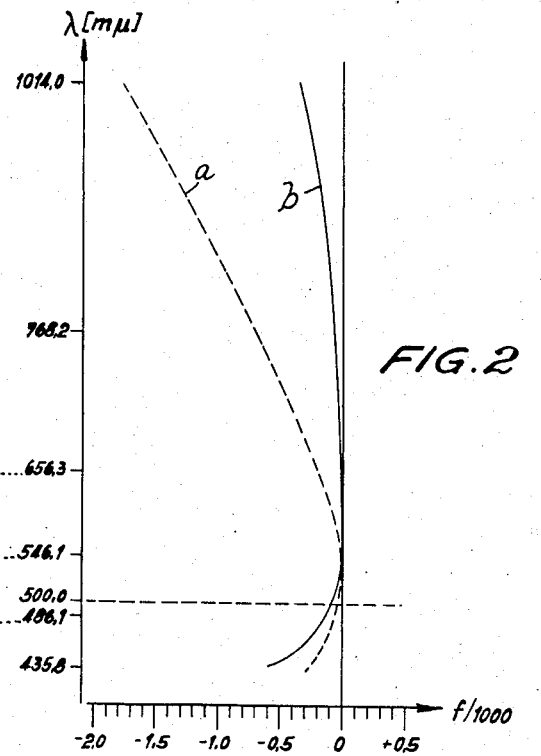

Referring first to Figure 1: A primary plain surface mirror 1 is provided, with a concave, spherically ground front surface $r_1$ having a reflecting layer 1R thereon, which directly reflects the light toward a secondary lens mirror 2. The latter consists of a highly corrected doublet of glasses spherically ground, cemented together and mirrorized in back. According to the invention this doublet is formed of a front lens having surfaces $r_2$, $r_3$ and a back lens having surfaces $r_3$, $r_4$ and these two lenses have maximum equality of specific powers of dispersion, based on their diffractions of light of relatively long wave length. At the same time, in accordance with said earlier patent, the front and back lenses have respectively, high and low refraction indices and low and high dispersion numbers based on their general powers of dispersion; they jointly provide negative focal power and they also provide aplanatic correction, the said surfaces being suitably curved for these purposes. As shown, the front surface $r_2$ of the front lens is concave to the light received from mirror 1 and is separated from said mirror by a distance $l_{1,2}$. Said front lens shares with the back lens the surface $r_3$, which is concave to the incoming light. The back surface $r_4$ of the back lens is ground with a long radius and with focal power opposite that of $r_1$, $r_2$ and $r_3$. Surface $r_4$ is convex to the incident light, while surfaces $r_1$, $r_2$ and $r_3$ are concave thereto, so that, according to a well-known convention, the value of the radius corresponding to $r_4$ is positive and the values of the three other radii are negative, with the further understanding that concave surface $r_1$ faces the concave surfaces $r_2$, $r_3$. Back surface $r_4$ also has a reflecting layer 2R thereon. Fabrication of the lens doublet is relatively simplified by the fact that all surfaces thereof are spherically ground, in lieu of the use of a hyperboloidal interceptor mirror as in the basic Cassegrainian mounting. For proper correction, the front and back lenses have axial thicknesses $d_{2,3}$ and $d_{3,4}$ respectively.

The aforementioned dispersion numbers of doublet 2, based on general powers of dispersion, are derived in the way known to persons skilled in the art from the refraction, by each part of the doublet, of red light, that of yellow or green light and that of blue light. More specifically those wave lengths of light are used for the determination of said numbers which correspond to the positions of the spectral lines known as Fraunhofer lines C, E and F, which lie respectively in the red, green and blue bands of the spectrum; and such wave lengths are also used for the determination of the relative partial dispersions which according to this invention are made substantially or at least approximately equal for the two parts of the doublet. In other words, the terms of importance for this invention are defined as follows:

$N_c$ = refraction index of each lens for wave length C
$N_e$ = refraction index of each lens for wave length E
$N_f$ = refraction index of each lens for wave length F $\dfrac{N_f - N_c}{N_e - 1}$ = general dispersive power of each lens $\dfrac{N_e - N_c}{N_f - N_c}$ = relative partial dispersion of each lens (hereinafter = $V_x'$)

In Figure 2 the positions of the C and F lines are indicated at 656.3 and 486.1 respectively and a position corresponding to the E line, at 546.1. The figure also shows, by a broken-line curve $a$ tangent on a vertical zero line, the residual chromatic aberrations of light of the different visible and near infrared wavelengths, as encountered in a telescope built in exact accordance with the most preferred values disclosed in the earlier patent, that is, with $N_e$ values of 1.6455 and 1.5148 and with V values of 48.0 and 60.0 for the two parts of doublet 2; the dimensions being those also shown and described in the earlier patent. It will be seen that with such design the residual aberration in question is below $\frac{1}{10,000}$ of the focal length of the instrument for green light but that it increases rather sharply for all other light.

Hitherto it was considered as desirable to use indices and numbers approximately such as those mentioned, thereby leading to residual chromatic aberrations approximately as shown by the broken-line curve. By contrast, if we now consider the above-defined concept of relative partial dispersion and if we equalize this value for the two parts of the doublet, so far as possible, while otherwise complying with the requirements of the earlier patent (the general idea thereof can be employed without change), a vastly different distribution of residual chromatic aberrations results, which is shown by the full-line curve $b$ in Figure 2. In other words, the dispersion of light of different wavelengths then becomes very minute in the yellow, orange, red and extreme red, remaining much slighter than before even in the near infrared.

It is true that the modification also causes, as shown by the lower part of the solid-line curve $b$, a slight increase of chromatic residual aberration in the blue part of the spectrum. This, however, constitutes no serious sacrifice in long-range telescopy, as it is generally usual and necessary to employ a color filter, usually yellow or orange, for cutting through haze with adequate efficiency. A typical absorption limit of such a filter is indicated in Figure 2 by the horizontal line at wavelength 500 and the filter itself may be visualized in Figure 1, for instance at any point to the left of the photographic film 4 which receives the light through aperture 3 in mirror 1. Higher absorption limits can also be used in many cases.

It will be seen that by means of the new arrangement, a residual chromatic aberration of less than $1/10,000$ can readily be provided, without sacrifice as to other performance provided according to the earlier patent, throughout a useful range of visible wavelengths extending from the green into the extreme red. Photographic recording, which may also use part of the near infrared range, can be similarly improved, as clearly indicated by the horizontal distances between the full-line and broken-line curves at each wavelength.

Thus it becomes possible by means of the present improvement to make the focal length and the general dimensions of the telescope relatively large and still to maintain residual aberrations in very small areas, it being possible also to comply fully with the general principle of the earlier patent, as shown by Figure 1, and thus to substantially avoid aplanatic aberration and stray reflection.

Even after the present improvement, considerable latitude remains for variations of numerical data of the system which may be used by a skilled computer. A preferred example of the present improvement, leading to the solid-line curve in Figure 2, is as follows:

[$F=1:8$  $f=1.00$]

| Glass | | | Radius | Thickness or Separation |
|---|---|---|---|---|
| $N_e$ | $V_e$ | $V_x'$ | | |
| mirrorized | | | $r_1=-1.016$ | $l_{1,2}=.267$ |
| 1.5319 | 51.64 | .5411 | $r_2=-.837$ | $d_{2,3}=.015$ |
| 1.5131 | 60.23 | .5432 | $r_3=-.106$ | $d_{3,4}=.010$ |
| mirrorized | | | $r_4=+2.444$ | |

I claim:

A telescope objective substantially consisting of a primary plain mirror and a secondary cemented lens mirror; the primary mirror having a central aperture surrounded by a spherically ground reflector surface which forms a plain first surface mirror; the secondary mirror having first and second, spherically ground lens elements which jointly provide negative focal power adapted to transmit an image formed by the primary mirror through the central aperture, said lens elements being cemented together and being mirrorized at that surface thereof which is most remote from the primary mirror; the objective having the following numerical data:

[$F=1:8$  $f=1.00$]

| Glass | | | Radius | Thickness or Separation |
|---|---|---|---|---|
| $N_e$ | $V_e$ | $V_x'$ | | |
| mirrorized | | | $r_1=-1.016$ | $l_{1,2}=.267$ |
| 1.5319 | 51.64 | .5411 | $r_2=-.837$ | $d_{2,3}=.015$ |
| 1.5131 | 60.23 | .5432 | $r_3=-.106$ | $d_{3,4}=.010$ |
| mirrorized | | | $r_4=+2.444$ | | wherein F is the relative aperture, $f$ is the focal length of the objective, $N_e$ is the refraction index, $V_e$ is the dispersion number, $V_x'$ is the relative partial dispersion $r_1$, $r_2$, $r_3$ and $r_4$ are the radii of curvature, respectively, of said surface of the primary mirror, front surface of first lens element, common surface of first and second lens element and back surface of second lens element and $l_{1,2}$, $d_{2,3}$, and $d_{3,4}$ are the axial distances between the surfaces having respectively, radii $r_1$ and $r_2$, radii $r_2$ and $r_3$ and radii $r_3$ and $r_4$, each radius being designated as positive when being convex to the light incident thereon and as negative when concave thereto, and the concave surface of radius $r_1$ facing the concave surfaces of radii $r_2$ and $r_3$.

References Cited in the file of this patent

UNITED STATES PATENTS

| | | |
|---|---|---|
| 1,967,214 | Acht | July 24, 1934 |
| 2,413,286 | Buchele | Dec. 31, 1946 |
| 2,504,383 | Bouwers et al. | Apr. 18, 1950 |
| 2,761,354 | Steglich | Sept. 4, 1956 |
| 2,850,945 | Kohler | Sept. 9, 1958 |

FOREIGN PATENTS

| | | |
|---|---|---|
| 82,671 | Germany | Aug. 7, 1895 |
| 568,058 | Germany | Sept. 15, 1931 |
| 754,943 | Germany | Oct. 13, 1952 |

OTHER REFERENCES

Photographic Lenses—Parts 1 and 2, translation of Das Photographische Objectiv by Merte, Richter, and von Rohr (1932), (translated April 1949, Central Air Documents Office), pages 245–247.